(12) United States Patent
Yukawa et al.

(10) Patent No.: US 8,299,163 B2
(45) Date of Patent: Oct. 30, 2012

(54) WATER-BASED PAINT COMPOSITIONS AND MULTILAYER COATING FILM-FORMING METHOD

(75) Inventors: Yoshiyuki Yukawa, Hiratsuka (JP); Noritoshi Nakane, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 394 days.

(21) Appl. No.: 12/450,310

(22) PCT Filed: Mar. 21, 2008

(86) PCT No.: PCT/JP2008/055990
§ 371 (c)(1),
(2), (4) Date: Sep. 21, 2009

(87) PCT Pub. No.: WO2008/123387
PCT Pub. Date: Oct. 16, 2008

(65) Prior Publication Data
US 2010/0093914 A1    Apr. 15, 2010

(30) Foreign Application Priority Data

Mar. 22, 2007  (JP) .................................. 2007-73940

(51) Int. Cl.
*C08L 67/06*  (2006.01)
*C08L 67/00*  (2006.01)
*C08L 33/02*  (2006.01)

(52) U.S. Cl. ......... 524/502; 524/501; 524/513; 524/539

(58) Field of Classification Search .................. 524/501, 524/513, 502, 539
See application file for complete search history.

(56) References Cited

U.S. PATENT DOCUMENTS

| | | | | |
|---|---|---|---|---|
| 4,981,885 A | * | 1/1991 | Engel et al. | 523/409 |
| 5,187,199 A | | 2/1993 | Sudo | |
| 5,489,645 A | * | 2/1996 | Tahara et al. | 524/817 |
| 5,627,249 A | | 5/1997 | Doki et al. | |
| 5,942,573 A | | 8/1999 | Doki et al. | |
| 7,022,759 B2 | * | 4/2006 | Martin et al. | 524/513 |
| 7,087,672 B2 | * | 8/2006 | Yuan et al. | 524/507 |
| 2004/0134791 A1 | | 7/2004 | Toi et al. | |
| 2005/0255330 A1 | * | 11/2005 | Meyer | 428/480 |
| 2008/0131714 A1 | | 6/2008 | Toi et al. | |
| 2009/0099298 A1 | * | 4/2009 | Yukawa | 524/506 |
| 2010/0323211 A1 | * | 12/2010 | Yukawa | 428/480 |

FOREIGN PATENT DOCUMENTS

| | | |
|---|---|---|
| GB | 2 254 328 | 10/1992 |
| JP | 2004-137504 | 5/2004 |
| WO | 2004/061025 | 7/2004 |

OTHER PUBLICATIONS

International Search Report issued Mar. 24, 2009 in International (PCT) Application No. PCT/JP2008/055990.
PCT Written Opinion issued Mar. 24, 2009 in International (PCT) Application No. PCT/JP2008/055990.

* cited by examiner

*Primary Examiner* — Satya Sastri
(74) *Attorney, Agent, or Firm* — Wenderoth, Lind & Ponack, L.L.P.

(57) ABSTRACT

This invention provides water-based paint compositions containing water-dispersible acrylic polymer particles, hydroxyl-containing resin and curing agent, the water-dispersible acrylic polymer particles having a weight-average molecular weight of at least 1,100,000 and an absorbance value not higher than 0.2 at a wavelength of 330 nm, as measured with spectrophotometer in the state of liquid dispersion at a mass concentration of 1.35% in 1,4-dioxane solvent; and the compositions excelling in finished appearance such as coated surface smoothness and coating film performance such as chipping resistance and water resistance.

33 Claims, No Drawings

WATER-BASED PAINT COMPOSITIONS AND MULTILAYER COATING FILM-FORMING METHOD

TECHNICAL FIELD

This invention relates to water-based paint compositions capable of forming coating films of excellent finished appearance, which also exhibit high performance in, for example, chipping resistance and water resistance.

BACKGROUND ART

Recently, environmental problems on global scale are gathering keen attention. In also the automotive industry, attempts for environmental improvement in the manufacturing steps are positively advanced. Manufacturing steps of automotives give rise to such problems as global warming, generation of industrial waste and discharge of volatile organic compounds (VOC). In particular, most of the VOC is discharged during the coating steps and effective countermeasure is of urgent necessity.

Outer panel portion of automobile bodies are normally coated with multilayer coating film formed of undercoat film of cationic electrocoating, intermediate coat film and top coat film, for imparting corrosion resistance and for aesthetic purpose. With the view to reduce VOC discharge, use of water-based paints for intermediate and top coatings is promoted.

Coating film on automobile bodies is, moreover, required to excel in the film performance, in particular, high finished appearance, chipping resistance (resistance to damages by small rocks sent flying by running cars) and water resistance. In respect of the chipping resistance, the intermediate coating film plays particularly important role.

However, conventional water-based paint in general are inferior in coating film performance such as mechanical properties and water resistance, as compared with organic solvent-based paint. As a means for overcoming this defect, for example, WO 04/61025 discloses a paint composition which contains a copolymer emulsion to which self-crosslinkability is imparted and which has a Tg, acid value and hydroxyl value each falling within a specific range, and a multilayer coating film-forming method using the paint composition, as a water-based intermediate paint composition which, when used to form a multilayer film, gives high chipping resistance and water resistance, and shows good compatibility with top coat and undercoat, and also excellent finished appearance, and a multilayer coating film-forming method using the paint composition. The weight-average molecular weight of the copolymer emulsion used therein is, however, around 50,000-1,000,000 and its effect for improving coating film performance such as chipping resistance is insufficient.

While it is generally effective for improving coating film performance, to use high molecular weight resins (in particular, acrylic resin), there is a problem that use of, for example, intraparticulate crosslinking type high molecular weight acrylic resin emulsion degrades finished appearance such as coated surface smoothness, and coating workability.

On the other hand, JP 2004-137504A discloses aqueous acrylamide polymer solution having a specific concentration and weight-average molecular weight of 500,000-10,000,000 at a specific viscosity range, as an aqueous high molecular weight polymer solution. The main utility of the polymer, however, is paper reinforcing agent. It is unsuitable for use in paint, because it shows unsatisfactory finishing property and coating workability as a high molecular weight acrylic resin for paint use, and coating film formed thereof has insufficient water resistance.

DISCLOSURE OF THE INVENTION

The object of the present invention is to provide water-based paint compositions which can form coating film excelling in finished appearance such as coated surface smoothness and also of excellent performance in such properties as chipping resistance and water resistance; and also to provide a multilayer coating film-forming method which uses the water-based paint composition(s).

We fixed our eyes on the influence of high molecular weight resin contained in paint, particularly on coating film performance and finished appearance such as coated surface smoothness, and made concentrative studies to now discover that water-dispersible acrylic polymer particles having specific absorbance characteristics, i.e., having an absorbance not higher than a specific value as measured with a spectrophotometer in a state of a liquid dispersion at a specific low concentration in dioxane solvent, and also having a weight average molecular weight of at least 1,100,000, are effective for achieving the above object, as the high molecular weight resin for water-based paint. Whereupon the present invention came to be completed.

Thus the invention provides a water-based paint composition characterized by comprising water-dispersible acrylic polymer particles (A), hydroxyl-containing resin (B) and curing agent (C), the water-dispersible acrylic polymer particles (A) having a weight-average molecular weight of at least 1,100,000 and an absorbance not higher than 0.2 at the wavelength of 330 nm as measured with spectrophotometer in the state of a liquid dispersion at a mass concentration of 1.35% in 1,4-dioxane solvent.

The invention furthermore provides a multilayer coating film-forming method comprising applying onto a coating object a cationic electrodeposition paint (a), heat-curing the same, then applying an intermediate paint (b), heat-curing the same, applying a top paint (c) and curing the same, which is characterized by using, as the intermediate paint (b) and/or the top paint (c), the above-described water-based paint composition(s).

The water-dispersible acrylic polymer particles which are used in the water-based paint compositions of the invention have a unique property that their liquid dispersion in 1,4-dioxane solvent has extremely high transparency, although the polymer has such a high molecular weight as at least 1,100,000.

For water-based paint containing high molecular weight polymer particles, usually crosslinked polymer particles are used in most cases, and which polymer particles, when dispersed in 1,4-dioxane solvent, show low transparency. Water-based paint in which such polymer particles are used, the polymer particles are apt to be irregularly distributed like islands in a sea-island structure, in the resulting coating film.

By contrast, in the water-based paint composition according to the invention the water-dispersible acrylic polymer particles having the above characteristics are used and, compared with water-based paint containing the particles whose liquid dispersion in 1,4-dioxane solvent shows poor transparency, the high molecular weight polymer particles can be uniformly distributed in continuous phase in the coating film.

In consequence, the water-based paint composition of the present invention exhibits good flow property regardless of the high molecular weight polymer particles contained therein as a constituent component and, therefore, excels in finished appearance such as the coated surface smoothness.

The water-based paint composition of the invention can form coating film excelling also in such performance as chipping resistance and water resistance.

Thus, the water-based paint composition of the present invention brings about the conspicuous effect of providing coating film superior in both finished appearance such as coated surface smoothness and performance such as chipping resistance and water resistance.

Hereinafter the water-based paint composition of the present invention is explained in further details.

The water-based paint composition of the present invention (which may be hereafter referred to as "the present paint") comprises water-dispersible acrylic polymer particles (A), hydroxyl-containing resin (B) and curing agent (C).

Water-Dispersible Acrylic Polymer Particles (A)

Water-dispersible acrylic polymer particles (A) in the present paint have a weight-average molecular weight of at least 1,100,000 and an absorbance at the wavelength of 330 nm not higher than 0.2, as measured as to their liquid dispersion in 1,4-dioxane solvent at a mass concentration of 1.35% with a spectrophotometer.

The less the above absorbance value, the higher the transparency of the liquid dispersion of the polymer particles in 1,4-dioxane solvent, indicating very low degree of crosslinkage of the polymer particles. The water-dispersible acrylic polymer particles (A) in the present paint have the characteristic feature of extremely high transparency, as indicated by the absorbance not higher than 0.2, preferably not higher than 0.15, in the state of a liquid dispersion in 1,4-dioxane solvent at a mass concentration of 1.35%.

In this specification, the liquid dispersion in 1,4-dioxane solvent encompasses both the solution and dispersion in which 1,4-dioxane serves as the solvent.

The water-dispersible acrylic polymer particles (A) can be obtained, for example, by emulsion polymerization of polymerizable unsaturated monomers represented by vinyl monomer in the presence of a dispersion stabilizer like surfactant, using radical polymerization initiator.

As emulsion-polymerizable unsaturated monomers, for example, carboxyl-containing polymerizable unsaturated monomer (M-1), hydroxyl-containing polymerizable unsaturated monomer (M-2), other polymerizable unsaturated monomer (M-3) and polyvinyl compound (M-4) which contains at least two polymerizable unsaturated groups per molecule, can be named.

Carboxyl-containing polymerizable unsaturated monomers (M-1) are the compounds having at least one carboxyl group and one polymerizable unsaturated group per molecule, for example, acrylic acid, methacrylic acid, crotonic acid, maleic acid, itaconic acid and the like. Furthermore, acid anhydrides of these compounds and monocarboxylic acids formed by half-esterification of the acid anhydrides are included in the monomer (M-1) in the present specification.

Such carboxyl-containing polymerizable unsaturated monomers are for introducing carboxyl groups into the water-dispersible acrylic polymer particles (A), and as the carboxyl-containing polymerizable unsaturated monomer, generally acrylic acid or methacrylic acid are frequently used. From the viewpoint of coating film performance such as water resistance, methacrylic acid is particularly preferred.

When acrylic acid is used, carboxyl groups in the formed polymer particles tend to be localized on the particle surfaces, because acrylic acid has higher degree of dissociation in water than methacrylic acid. Whereas, when methacrylic acid is used, carboxyl groups can be more easily uniformly distributed inside of the particles, than the case of using acrylic acid. When methacrylic acid is used for this reason, presumably the carboxyl groups which are hydrophilic groups come to be uniformly distributed inside the particles and water resistance (whitening resistance) of the coating film formed therefrom is improved.

These carboxyl-containing polymerizable unsaturated monomers (M-1) can be used either alone or in combination of two or more.

Hydroxyl-containing polymerizable unsaturated monomers (M-2) are the compounds having one each of hydroxyl group and polymerizable unsaturated group per molecule, the hydroxyl group acting as the functional group to react with the crosslinking agent. As the monomers, monoesterified products of acrylic acid or methacrylic acid with $C_{2-10}$ dihydric alcohols are preferred, examples of which including hydroxyl-containing acrylate monomers such as 2-hydroxyethyl acrylate, 2-hydroxypropyl acrylate, 3-hydroxypropyl acrylate, 4-hydroxybutyl acrylate and the like; hydroxyl-containing methacrylate monomers such as 2-hydroxyethyl methacrylate, 2-hydroxypropyl methacrylate, 3-hydroxypropyl methacrylate, 4-hydroxybutyl methacrylate and the like; N-methylolacrylamide, N-methylolmethacrylamide and the like.

Of these, hydroxyl-containing methacrylate monomers are preferred from the viewpoint of water resistance, 2-hydroxyethyl methacrylate being particularly preferred.

These hydroxyl-containing polymerizable unsaturated monomers (M-2) can be used either alone or in combination of two or more.

Other polymerizable unsaturated monomers (M-3) are the compounds other than above monomers (M-1) and (M-2), having one polymerizable unsaturated group per molecule, specific examples of which are enumerated in the following (1)-(8):

(1) monoesterified products of acrylic acid or methacrylic acid with $C_{1-20}$ monohydric alcohols; for example, methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, lauryl acrylate, lauryl methacrylate, stearyl acrylate, stearyl methacrylate and the like, (2) aromatic vinyl monomers: for example, styrene, α-methylstyrene, vinyltoluene and the like, (3) glycidyl-containing vinyl monomers: compounds having at least one glycidyl group and one polymerizable unsaturated bond per molecule, e.g., glycidyl acrylate, glycidyl methacrylate and the like, (4) nitrogen-containing alkyl ($C_{1-20}$) (meth)acrylates: for example, dimethylaminoethyl acrylate, dimethylaminoethyl methacrylate and the like, (5) polymerizable unsaturated group-containing amide compounds: compounds having at least one amido group and one polymerizable unsaturated bond per molecule, e.g., acrylamide, methacrylamide, dimethylacrylamide, N,N-dimethylpropyl-acrylamide, N-butoxymethylacrylamide, diacetonacrylamide and the like, (6) polymerizable unsaturated group-containing nitrile compounds: for example, acrylonitrile, methacrylonitrile and the like, (7) diene compounds: for example, butadiene, isoprene and the like, (8) vinyl compounds: for example, vinyl acetate, vinyl propionate, vinyl chloride and the like.

These other vinyl monomers (M-3) can be used either alone or in combination of two or more.

Polyvinyl compounds (M-4) are the compounds having at least two polymerizable unsaturated groups per molecule, and as examples of which ethylene glycol diacrylate, ethylene glycol dimethacrylate, triethylene glycol diacrylate, tetraethylene glycol dimethacrylate, 1,6-hexanediol diacrylate, allyl methacrylate, allyl acrylate, divinylbenzene, trimethylolpropane triacrylate, methylenebis(meth)acrylamide, ethylenebis (meth)acrylamide and the like can be named. The polyvinyl compounds (M-4) do not include above diene compounds.

These polyvinyl compounds (M-4) can be used either alone or in combination of two or more.

The use ratios of the polymerizable unsaturated monomers in the occasion of producing the water-dispersible acrylic polymer particles (A) are, based on the total amount of the polymerizable unsaturated monomers, the carboxyl-containing polymerizable unsaturated monomer (M-1) is within a range of generally 0.1-25 mass %, preferably 0.1-10 mass %, inter alia, 0.5-5 mass %, from the viewpoint of water-dispersibility and water resistance of the polymer particles; the hydroxyl-containing polymerizable unsaturated monomer (M-2) is, while differing depending on the kind and amount of the curing agent used, within a range of generally 0.1-40 mass %, preferably 0.1-25 mass %, inter alia, 1-10 mass %, from the viewpoints of curability and water resistance of the coating film; and other polymerizable unsaturated monomer (M-3) can be within a range of generally 35-99.8 mass %, preferably 65-99.8 mass %.

Also from the viewpoint of imparting high molecular weight and reducing unreacted residual monomeric component, it is recommendable to use acrylate monomer and styrene in a combined amount within a range of generally 20-80 mass %, in particular, 25-70 mass %, inter alia, 30-60 mass %.

Polyvinyl compound (M-4) can be used where necessary, but from the viewpoint of obtaining water-dispersible acrylic polymer particles showing the absorbance value not higher than 0.2 indicating high transparency, in other words, having extremely low degree of crosslinkage, it is preferable to use it in a very minor amount, even when used. Therefore, the use ratio of the polyvinyl compound (M-4) based on the total amount of the polymerizable unsaturated monomers can be within a range of generally 0-1 mass %, preferably 0-0.3 mass %, inter alia, 0-0.05 mass %.

As the dispersion stabilizer, anionic emulsifier, nonionic emulsifier, amphoteric emulsifier and the like can be used, specific examples including, as anionic emulsifier, fatty acid, alkylsulfuric acid ester salt, alkylbenzenesulfonic acid salt, alkylsphoric acid salt and the like; and as nonionic emulsifier, polyoxyethylene alkyl ether, polyoxyethylene alkylallyl ether, polyoxyethylene derivatives, sorbitan fatty acid ester, polyoxyethylene sorbitan fatty acid ester, polyoxyethylene alkylamine, alkylalkanolamide and the like. As amphoteric emulsifier, for example, alkylbetaine can be named.

As the dispersion stabilizer, reactive emulsifier can be used with particular advantage, from the viewpoint of copolymerizability of the vinyl monomers constituting the water-dispersible acrylic polymer particles in the emulsion polymerization reaction, dispersion stability of the water-dispersible acrylic polymer particles (A) in the present paint, performance such as water resistance of the coating film formed from the present paint and reduction of residual monomer for environmental protection. Reactive emulsifier refers to emulsifiers radical-reactable with the vinyl monomers, which include surfactant having polymerizable unsaturated group(s) per molecule.

Specific examples of reactive emulsifier include ELEMINOL JS-1, ELEMINOL JS-2 (tradename, Sanyo Chemical Industries, Ltd.); S-120, S-180A, S-180, LATEMUL PD-104, LATEMUL PD-420, LATEMUL PD-430S, LATEMUL PD-450 (tradename, KAO Corporation); AQUALON HS-10, AQUALON KH-10 (tradename, Daiichi Kogyo Seiyaku Co., Ltd.); Adekariasoap SE-10N, Adekariasoap SE-20N, Adekariasoap SR-1025, Adekariasoap ER-10, Adekaria Soap ER-20, Adekariasoap ER-30, Adekariasoap ER-40 (tradename, Asahi Denka Kogyo K.K.); ANTOX MS-60 (tradename, Nippon Nyukazai Co., Ltd.) and the like. Of the above reactive emulsifiers, particularly those having polyoxyethylene group(s) represented by the formula —($CH_2CH_2O$)$_n$— [here n is an integer of 5-60, preferably 10-55, inter alia, 20-45] and polymerizable unsaturated group(s) per molecule are preferred. Specific examples of such reactive emulsifier include Adekariasoap ER-30, Adekariasoap ER-40 and LATEMUL PD-450.

The water-dispersible acrylic polymer particles synthesized with use of such a reactive emulsifier having the above polyoxyethylene groups and polymerizable unsaturated groups take the construction that the polyoxyethylene groups of the reactive emulsifier are grafted to the main chains of the water-dispersible acrylic polymer particles like branches, which act like a dispersion stabilizer for hydrophobic components such as pigment, curing agent and the like in the paint composition in the state of a coating liquid, and also act as an agent to make the particles compatible with other components in the uncured coating film. Hence they are particularly suitable as the water-dispersible acrylic polymer particles (A) to be used in the paint compositions of the present invention.

Dispersion stabilizers such as above-described emulsifiers can be used either alone or in combination of two or more in the emulsion polymerization reaction.

The use ratio of such dispersion stabilizer is preferably within a range of generally 0.1-10 mass %, in particular, 1-7.5 mass %, inter alia, 1.5-6 mass %, based on the formed water-dispersible acrylic polymer particles.

When a reactive emulsifier is used as the dispersion stabilizer, the use ratio of the reactive emulsifier is preferably within a range of generally 0.1-10 mass %, in particular, 1.5-7.5 mass %, inter alia, 2-6 mass %, based on the formed water-dispersible acrylic polymer particles.

As the radical polymerization initiator, for example, peroxides represented by ammonium persulfate, potassium persulfate, ammonium peroxide and the like; so-called redox initiators formed of above peroxides in combination with reducing agents such as sodium hydrogensulfite, sodium thiosulfate, Rongalit, ascorbic acid and the like; and azo compounds such as 2,2'-azobisisobutyronitrile, 4,4'-azobis(4-cyanopentanoic acid), 2,2'-azobis[2-methyl-N-(2-hydroxyethyl)-propionamide] and the like can be named. Of those, azo compounds are preferred.

Of those azo compounds, particularly those which are difficulty water-soluble, having a solubility in 25° C. water not higher than 3 mass %, are preferred. Specific examples of such azo compounds include 2,2'-azobisisobutyronitrile, 2,2'-azobis-2-methylbutyronitrile, 2,2'-azobis-2,4-dimethylvaleronitrile, 1,1'-azobis(1-cyclohexane-1-carbonitrile), 2,2'-azobis[2-methyl-N-(2-hydroxyethyl)-propionamide], 2,2'-azobis[2-(2-imidazolin-2-yl)propane] and dimethyl-2,2'-azobisisobutyrate. From the viewpoint of obtaining high molecular weight, 2,2'-azobisisobutyronitrile, 2,2'-azobis[2-(2-imidazolin-2-yl)propane] and dimethyl-2,2'-azobisisobutyrate are particularly preferred.

Suitable use ratio of the radical polymerization initiator is, based on the total mass of the solid content of polymerizable unsaturated monomers forming the water-dispersible acrylic polymer particles, within a range of normally 0.01-5.0 mass %, preferably 0.01-3.0 mass %, inter alia, 0.01-1.0 mass %.

The adequate combined concentration of radical-polymerizable unsaturated monomers during the emulsion polymerization reaction is normally within a range of 0.1-60 mass %, preferably 0.5-50 mass %, inter alia, 1-50 mass %.

The reaction temperature in the occasion of emulsion polymerization differs depending on the kind or radical polymerization initiator used, while it can be normally within a range of 40-100° C., preferably 50-90° C., inter alia, 60-80° C. Also the reaction time can be normally 3-24 hours, preferably 5-20 hours, inter alia, around 7-16 hours.

The water-dispersible acrylic polymer particle can take either of ordinary homogeneous structure or multilayered structure such as core/shell structure.

Specifically, core/shell structured water-dispersible acrylic polymer particle (A) can be obtained by, for example, first emulsion polymerizing the polymerizable unsaturated monomeric component containing no or little carboxyl-containing polymerizable unsaturated monomer (M-1), thereafter adding the polymerizable unsaturated monomeric component containing a large amount of the carboxyl-containing polymerizable unsaturated monomers (M-1), and continuing the emulsion polymerization. Linkage of the core part and shell part can be effected, for example, by copolymerizing the polymerizable unsaturated bonds derived from polyvinyl compound (M-4) such as allyl acrylate, allyl methacrylate or the like, which are remaining on the surface of the core part, with the polymerizable unsaturated monomeric component containing carboxyl-containing polymerizable unsaturated monomer (M-1).

The water-dispersible acrylic polymer particles (A) can have a hydroxyl value within a range of generally 0-150 mgKOH/g, preferably 5-100 mgKOH/g, inter alia, 10-50 mgKOH/g, from the viewpoint of water resistance and curability of the coating film.

The water-dispersible acrylic polymer particles (A) also can have an acid value within a range of generally 0.1-100 mgKOH/g, preferably 0.5-50 mgKOH/g, inter alia, 1-35 mgKOH/g, from the viewpoint of storage stability or water resistance of resulting coating film.

Furthermore, the water-dispersible acrylic polymer particles (A) can have an average particle size within a range of 10-500 nm, preferably 20-300 nm, inter alia, 40-200 nm, from the viewpoint of dispersion stability of the particles and smoothness of resulting coating film.

In the present specification, the average particle size of the water-dispersible acrylic polymer particles (A) is a value measured with a submicron particle size distribution measuring device at 20° C., after diluting individual sample with deionized water according to the accepted practice. As the submicron particle size distribution measuring device, for example, COULTER N4 Model (tradename, Beckman Coulter, Inc.) can be used.

From the viewpoint of storage stability or performance of resulting coating film such as chipping resistance and water resistance, the water-dispersible acrylic polymer particles (A) can have an weight-average molecular weight not less than 1,100,000, in particular, within a range of 1,100,000-10,000,000, preferably 1,200,000-5,000,000, inter alia, 1,300,000-4,000,000.

The weight-average molecular weight of water-dispersible acrylic polymer particles can be measured by static light-scattering method. Specifically, it can be determined by using a multi-angle light-scattering detector and making Zimm plot(s) or the like or, according to SEC-MALLS method in which size-exclusion chromatograph is connected to a multi-angle light-scattering detector, drawing Debye plot.

In the present specification, the weight-average molecular weight of the water-dispersible acrylic polymer particles is a value obtained by measuring the weight-average molecular weight according to above SEC-MALLS method.

Generally in molecular weight measurements by light-scattering method, the following fundamental equation of light-scattering is used:

$$Kc/R(\theta)=1/M_w P(\theta)+2A_2 c+ \qquad (1)$$

R(θ)=reducing strength of scattered light (Rayleigh coefficient) at angle θ,
c=sample concentration
Mw=weight-average molecular weight
$A_2$=second virial coefficient
K=optical parameter
P(θ)=angular scattering function.

Whereas, the weight-average molecular weight in the present specification is a value calculated from the equation (1) in which the second and subsequent terms which are the products of second virial coefficient multiplied by the sample concentration are ignored, similar to the SEC-MALLS method in which size-exclusion chromatograph is connected to a light-scattering detector.

Inclusive of the measurements in the later-appearing Production Examples, in the present specification DAWN DSP Laser Photometer (Wyatt Technology Corporation) was used as the detector, and as the columns three columns in total of two KF-806L and one KF-802 (tradename, Shodex Co.) were used, and the measurement was conducted under the conditions of the solvent: tetrahydrofuran, measuring temperature: 40° C., flow rate: 1 cc/min., and sample concentration: 0.1 mass %.

The samples were prepared by drying emulsions of the water-dispersible acrylic polymer particles (A) at ambient temperature, preparing their 2.5 mass % tetrahydrofuran solutions and dissolving them at room temperature for 2 hours. At the time of measurement, each sample was further diluted to 0.1 mass % with tetrahydrofuran, filtered with a membrane filter of 1 μm in pore size, and used as the specimen to be measured.

The absorbance of the water-dispersible acrylic polymer particles (A) in the state of liquid dispersion in 1,4-dioxane solvent was measured as follows. An emulsion of the water-dispersible acrylic polymer particles (A) was dried at ambient temperature and formed into a solution or dispersion in 1,4-dioxane solvent at a mass concentration of 1.35% to be used as the sample. Its absorbance was measured with a spectrophotometer under the condition of 330 nm in wavelength, and the measured value was divided by the cell length (unit:cm) to obtain the absorbance per cm. As the spectrophotometer, U-4100 (tradename, HITACHI Ltd.) was used.

From the viewpoint of finished appearance of resulting coating film, the water-dispersible acrylic polymer particles (A) have the absorbance value not higher than 0.2, preferably not higher than 0.15, inter alia, not higher than 0.1, as measured in the state of liquid dispersion in 1,4-dioxane solvent at a concentration of 1.35 mass % with the spectrophotometer at a wavelength of 330 nm.

The water-dispersible acrylic polymer particles (A) having such an absorbance value can be obtained by, for example, emulsion polymerizing the above-described polymerizable unsaturated monomers in the presence of a dispersion stabilizer, at temperatures not higher than 80° C., preferably at 60-80° C., using azo compound, preferably difficulty water-soluble azo compound, as the radical polymerization initiator.

The water-dispersible acrylic polymer particles (A) are preferably neutralized with basic compound. As the neutralizer for the water-dispersible acrylic polymer particles (A), ammonia or water-soluble amino compound, for example, monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, 2-amino-2-methylpropanol, diethanolamine, morpholine and the like can be conveniently used.

Hydroxyl-Containing Resin (B)

The resin species for hydroxyl-containing resin (B) used in the present invention are subject to no particular limitation and, for example, acrylic resin, polyester resin, urethane-modified polyester resin and epoxy resin can be used.

Of those, hydroxyl-containing acrylic resin and hydroxyl-containing polyester resin are preferably used in the present invention. Hereafter these resins are described in further details.

Hydroxyl-Containing Acrylic Resin

Acrylic resins which can be synthesized by (co)polymerization of polymerizable unsaturated monomer(s) represented by vinyl monomers by per se known methods and are other than the water-dispersible acrylic polymer particles (A) as described in the foregoing, are covered herein. The synthesis may be carried out either emulsion polymerization or solution polymerization, or the two methods may be concurrently used. Where solution polymerization is used for the synthesis, it is preferred to use, as the organic solvent for the reaction, hydrophilic organic solvent such as, for example, propylene glycol ether-type or dipropylene glycol ether-type.

It is also preferred for the acrylic resin to have acid groups like carboxyl groups in addition to hydroxyl groups, from the viewpoint of water dispersibility.

As the polymerizable unsaturated monomers, those known per se can be used, for example, hydroxyl-containing polymerizable unsaturated monomer, carboxyl-containing polymerizable unsaturated monomer and other polymerizable unsaturated monomer.

Examples of hydroxyl-containing polymerizable unsaturated monomer include hydroxyalkyl (meth)acrylate such as 2-hydroxyethyl (meth)acrylate, hydroxypropyl (meth)acrylate and 4-hydroxybutyl (meth)acrylate; tetrahydrofurfuryl (meth)acrylate, ε-caprolactone-modified tetrahydrofurfuryl (meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate and phthalic acid monohydroxyethyl (meth) acrylate.

Examples of carboxyl-containing polymerizable unsaturated monomer include acrylic acid and methacrylic acid.

As other polymerizable unsaturated monomer, for example, styrene, methyl (meth)acrylate, ethyl (meth)acrylate, butyl (meth)acrylate, 2-ethylhexyl (meth)acrylate, lauryl (meth)acrylate, cyclohexyl (meth)acrylate, cyclohexenyl (meth)acrylate, phenoxyethyl (meth)acrylate, phenoxypolyethylene glycol (meth)acrylate, dicyclopentenyl (meth)acrylate, dicyclopentenyloxyethyl (meth)acrylate, isobornyl (meth)acrylate, benzyl (meth)acrylate, p-cumylphenolethylene oxide-modified (meth)acrylate, N-(methylol) (meth) acrylamide, N-butoxy (meth)acrylamide, acryloylmorpholine, dimethylaminoethyl (meth)acrylate, N-vinyl-2-pyrrolidone, γ-acryloxypropyltrimethoxysilane and the like can be named.

In the present specification, "(meth)acrylate" means acrylate or methacrylate.

The hydroxyl-containing acrylic resin which is synthesized by solution polymerization preferably has a weight-average molecular weight within a range of generally 1,000-200,000, in particular, 1,500-150,000, inter alia, 2,000-100,000, from the viewpoint of weatherability and finished appearance.

In the present specification, weight-average molecular weight of the resins other than the water-dispersible acrylic polymer particles (A) is the value calculated from size-exclusion chromatography, by converting it to molecular weight of polystyrene from the calibration curve of the molecular weight of standard polystyrene. The measurement was conducted using as the measuring device HLC8120GPC (tradename, Tosoh Corporation) and four columns of TSKgel G-4000HXL, TSKgel G-3000HXL, TSKgel G-2500-HXL and TSKgel G-2000HXL (tradename, Tosoh Corporation) under the conditions of mobile phase; tetrahydrofuran, measuring temp.; 40° C., flow rate; 1 cc/min. and detector; RI.

The hydroxyl-containing acrylic resin, where it is prepared by solution polymerization, preferably has a hydroxyl value within a range of generally 10-250 mgKOH/g, in particular, 20-200 mgKOH/g, inter alia, 30-150 mgKOH/g, from the viewpoint of curability of the coating film, and preferably has an acid value within a range of generally 3-150 mgKOH/g, in particular, 4-100 mgKOH/g, inter alia, 5-70 mgKOH/g, from the viewpoint of dispersion stability in the water-based paint and curability and adherability of the coating film.

On the other hand, where it is synthesized by emulsion polymerization, the hydroxyl-containing acrylic resin preferably has a hydroxyl value within a range of generally 5-150 mgKOH/g, in particular, 7.5-120 mgKOH/g, inter alia, 10-90 mgKOH/g, from the viewpoint of water resistance and curability of the coating film, and also from the viewpoint of water resistance of the coating film, preferably has an acid value within a range of generally 0.01-100 mgKOH/g, in particular, 0.05-90 mgKOH/g, inter alia, 0.1-75 mgKOH/g.

Where the hydroxyl-containing acrylic resin contains acid groups and is dispersed in water, it is preferable to neutralize it with a neutralizer to improve water dispersibility by facilitating its mixing into water and dispersion therein. Examples of neutralizer in that occasion include hydroxides of alkali metals or alkaline earth metals, such as sodium hydroxide, potassium hydroxide, lithium hydroxide, calcium hydroxide and barium hydroxide; ammonia; primary monoamine compounds such as ethylamine, propylamine, butylamine, cyclohexylamine, monoethanolamine, isopropanolamine, neopentanolamine, 2-aminopropanol, 3-aminopropanol and 2-amino-2-methylpropanol; secondary monoamine compounds such as diethylamine, dibutylamine, diethanolamine, dipropylamine, diisopropanolamine, N-methylethanolamine, N-ethylethanolamine and N-methylisopropanolamine; tertiary monoamine compounds such as triethylamine, tributylamine, dimethylethanolamine, diethylethanolamine, methyldiethanolamine, dimethylaminoethanol and triethanolamine; polyamine compounds such as ethylenediamine, diethylenetriamine, hydroxyethylaminoethylamine, ethylaminoethylamine and methylaminopropylamine; and pyridine; morpholine and the like. Of these, use of primary monoamine compound, secondary monoamine compound, tertiary monoamine compound or polyamine compound is preferred.

Hydroxyl-Containing Polyester Resin

The polyester resins are those synthesized through esterification reaction of polybasic acid with polyhydric alcohol according to customary practices. As the polyester resins, those having acid groups such as carboxyl group, in addition to hydroxyl groups, from the viewpoint of water dispersibility.

Polybasic acid is a compound having at least two carboxyl groups per molecule, examples of which include phthalic acid, isophthalic acid, terephthalic acid, succinic acid, adipic acid, azelaic acid, sebacic acid, naphthalenedicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methylhexahydrophthalic acid and anhydrides of those acids.

Polyhydric alcohol is a compound having at least two hydroxyl groups per molecule, examples of which include glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester and the like; polyesterdiols such as polylactonediols formed by adding lactones such as ε-caprolactone to these glycols, bis(hydroxyethyl)-terephthalate and the like; 1,3-cyclohexanedimethanol, 1,4-cyclohexanedimethanol, tricyclodecanedimethanol, hydrogenated bisphenol A, hydrogenated bisphenol F, spiroglycol, dihydroxymethyltricyclodecane; glycerine, trimethylolpropane, trimethylolethane, diglycerine, triglycerine, 1,2,6-hexanetriol, pentaerythritol, dipentaerythritol, tripentaerythritol, sorbitol, mannitol; and hydroxycarboxylic acids such as 2,2-dimethylolpropionic acid, 2,2-dimethylolbutanoic acid, 2,2-dimethylolpentanoic acid, 2,2-dimethylolhexanoic acid, 2,2-dimethyloloctanoic acid and the like.

As the hydroxyl-containing polyester resin, fatty acid-modified polyester resins can also be used, which are modified with (semi)dry oil fatty acid such as linseed oil fatty acid, coconut oil fatty acid, safflower oil fatty acid, soybean oil fatty acid, sesame oil fatty acid, perilla oil fatty acid, hemp oil fatty acid, tall oil fatty acid, dehydrated castor oil fatty acid and the like. Generally preferred extent of modification with these fatty acids is not more 30 wt % in terms of oil length. It is also permissible to use those which are partially reacted with monobasic acid such as benzoic acid.

The hydroxyl-containing polyester resin may be those formed by reaction of α-olefin epoxide such as propylene oxide or butylene oxide, monoepoxy compound such as CARDURA E10 (tradename, Japan Epoxy Resin Co., Ltd., glycidyl ester of synthetic, highly branched saturated fatty acid), and the like with acid groups in the polyester resin.

Introduction of carboxyl groups into the polyester resin can be done, for example, by adding acid anhydride to the hydroxyl-containing polyester resin to cause half-esterification.

From the viewpoint of water resistance and adherability of the coating film, the hydroxyl-containing polyester resin preferably has an acid value within a range of generally 5-100 mgKOH/g, in particular, 7.5-80 mgKOH/g, inter alia, 10-60 mgKOH/g.

Also from the viewpoint of water resistance and curability of the coating film, the hydroxyl-containing polyester resin preferably has a hydroxyl value within a range of generally 10-250 mgKOH/g, in particular, 25-200 mgKOH/g, inter alia, 40-170 mgKOH/g.

Again from the viewpoint of water resistance and curability of the coating film, the hydroxyl-containing polyester resin preferably has a weight-average molecular weight within a range of generally 1,000-200,000, in particular, 1,500-150,000, inter alia, 2,000-100,000.

Where the hydroxyl-containing polyester resin contains acid groups and is dispersed in water, it is preferably neutralized with a neutralizer to facilitate mixing and dispersing in water, from the viewpoint of improving water dispersibility.

As the neutralizer, those named as examples in relation to the acrylic resins can be similarly used.

Curing Agent (C)

The curing agent (C) to be used in the paint compositions of the present invention is not particularly limited, but those routinely used in the art of paint can be used in the similar manner and, for example, hereafter named melamine resins and blocked polyisocyanate compounds can be conveniently used. Those curing agents can be used either alone or in combination of two or more.

Examples of the melamine resin include methylolmelamines such as dimethylolmelamine, trimethylolmelamine, tetramethylolmelamine, pentamethylolmelamine and hexamethylolmelamine; alkyletherified products of methylolmelamines with alkanols; and etherified products of methylolmelamine condensates with alkanols. As the alkanols, for example, methyl alcohol, ethyl alcohol, propyl alcohol, isopropyl alcohol, butyl alcohol, isobutyl alcohol, 2-ethylhexyl alcohol and the like can be used.

As the melamine resin, for example, melamine resin having at least three methyletherified methylol groups per one triazine nucleus on the average; hydrophilic imino group-containing alkyletherified melamine resin having a weight-average molecular weight of about 500-about 1,000; and the like can be conveniently used.

As the melamine resin, those available on the market can also be used. As such, for example, CYMEL 303, CYMEL 323, CYMEL 325, CYMEL 327, CYMEL 350, CYMEL 370, CYMEL 380, CYMEL 385, CYMEL 212, CYMEL 253, and CYMEL 254 (tradename, Nippon Cytec Industries K.K.); REGIMIN 735, REGIMIN 740, REGIMIN 741, REGIMIN 745, REGIMIN 746 and REGIMIN 747 (tradename, Monsanto Chemical Co.); SUMIMAL M55, SUMIMAL M30W and SUMIMAL M50W (tradename, Sumitomo Chemical Co., Ltd.); U-VAN20SE (tradename, Mitsui Chemicals Inc.); and the like can be named.

Furthermore, when melamine resin is used as the curing agent, sulfonic acid such as paratoluenesulfonic acid, dodecylbenzenesulfonic acid and dinonylnaphthalenesulfonic acid; neutralized salt of the sulfonic acid with amine; and neutralized salt of phosphoric acid ester compound with amine; and the like can be used as curing catalyst.

Blocked polyisocyanate compound is a polyisocyanate compound having at least two isocyanate groups per molecule, whose isocyanate groups are blocked with a blocking agent.

As polyisocyanate compounds in blocked polyisocyanate compounds, for example, aliphatic polyisocyanate, alicyclic polyisocyanate, aromatic-aliphatic polyisocyanate, aromatic polyisocyanate and derivatives of these polyisocyanates can be used.

Examples of the aliphatic polyisocyanate include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate and the like; and aliphatic triisocyanates such as lysine ester triisocyanate, 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanatomethyloctane and the like.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'- methylenebis (cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, norbornane diisocyanate and the like; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1) heptane, 3-(3-isocyanatopropyl)-2,5-di(isocyanatomethyl)-bicyclo(2.2.1)heptane, 5-(2- isocyanatoethyl)-2-isocyanatomethyl-3-(3-isocyanatopropyl)-bicyclo(2.2.1) heptane, 6-(2-isocyanatoethyl)-2- isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, 6-(2-isocyanatoethyl)-2-isocyanatomethyl-2-(3-isocyanatopropyl)-bicyclo(2.2.1)heptane and the like.

Examples of the aromatic-aliphatic polyisocyanate include aromatic-aliphatic diisocyanates such as 1,3- or 1,4-xylylene diisocyanate or mixtures thereof, ω,ω'-diisocyanato-1,4-diethylbenzene, 1,3- or 1,4-bis(1-isocyanato-1-methylethyl) benzene (common name: tetramethylxylylene diisocyanate) or mixtures thereof; and aromoatic-aliphatic triisocyanates such as 1,3,5-triisocyanatomethylbenzene and the like.

Examples of the aromatic polyisocyanate include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, 4,4'-diphenylether diisocyanate and the like; aromatic triisocyanates such as triphenylmethane-4,4',4"-triisocyanate, 1,3,5-triisocyanatobenzene, 2,4,6-triisocyanatotoluene and the like; and aromatic tetraisocyanates such as diphenylmethane-2,2',5,5'-tetraisocyanate and the like.

Also as the polyisocyanate derivatives, for example, their dimers, trimers, biurets, allophanates, carbodiimides, urethodiones, urethoimines, isocyanurates, oxadiazintrione, polymethylene polyphenyl polyisocyanate (crude MDI, polymeric MDI), crude TDI and the like can be named.

Blocking agent is to block free isocyanate groups. The blocking agent dissociates from blocked polyisocyanate compound when the latter is heated to, for example, at least 100° C., preferably at least 130° C., to regenerate the isocyanate groups which can readily react with hydroxyl groups. Examples of the blocking agent include phenols such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid; lactic acid esters such as methyl lactate, ethyl lactate, butyl lactate and the like; alcohols such as methylolurea, methylolmelamine, diacetone alcohol, 2-hydroxyethyl acrylate, 2-hydroxyethyl methacrylate and the like; oximes such as formamidoxime, acetamidoxime, acetoxime, methyl ethyl ketoxime, diacetylmonooxime, benzophenone-oxime, cyclohexane-oxime and the like; active methylenes such as dimethyl malonate, diethyl malonate, ethyl acetoacetate, methyl acetoacetate, acetylacetone and the like; mercaptans such as butyl mercaptan, t-butyl mercaptan, hexyl mercaptan, t-dodecyl mercaptan, 2-mercaptobenzothiazole, thiophenol, methylthiophenol, ethylthiophenol and the like; acid amides such as acetanilide, acetanisidide, acetotoluide, acrylamide, methacrylamide, acetic acid amide, stearic acid amide, benzamide and the like; imides such as succinimide, phathalimide, maleimide and the like; amines such as diphenylamine, phenylnaphthylamine, xylidine, N-phenylxylidine, carbazole, aniline, naphthylamine, butylamine, dibutylamine, butylphenylamine and the like; imidazoles such as imidazole, 2-ethylimidazole and the like; pyrazoles such as 3,5-dimethylpyrazole; ureas such as urea, thiourea, ethyleneurea, ethylenethiourea, diphenylurea and the like; carbamic acid esters such as phenyl N-phenylcarbamate; imines such as ethyleneimine, propyleneimine and the like; and sulfites such as sodium disulfite, potassium disulfite and the like.

When blocked polyisocyanate compound is used as the curing agent, for example, organotin compound may be used as the curing catalyst.

Water-Based Paint Composition

The water-based paint composition of the present invention can be prepared by formulating the above-described water-dispersible acrylic polymer particles (A), hydroxyl-containing resin (B) and curing agent (C) into paint, by the method known per se.

Adequate blend ratios of the water-dispersible acrylic polymer particles (A), hydroxyl-containing resin (B) and curing agent (C) in the water-based paint composition of the present invention are, based on the total solid resin content, the water-dispersible acrylic polymer particles (A) is within a range of generally 1-80 mass %, preferably 3-70 mass %, inter alia, 5-60 mass %; the hydroxyl-containing resin (B) is within a range of generally 1-90 mass %, preferably 3-80 mass %, inter alia, 5-70 mass %; and the curing agent (C), within a range of generally 5-60 mass %, preferably 7.5-50 mass %, inter alia, 10-40 mass %; in terms of solid content (non-volatile component).

Where necessary, pigment may be blended in the water-based paint composition of the present invention. As the pigment, for example, coloring pigment such as titanium dioxide, zinc flower, Carbon Black, Phthalocyanine Blue, Prussian Blue, Cobalt Blue, azo pigment, phthalocyanine pigment, quinacridone pigment, isoindoline pigment, vat pigment and perylene pigment; extenders such as talc, clay, kaoline, baryta, barium sulfate, barium carbonate, calcium carbonate, silica and alumina white; and effect pigment such as aluminum powder, mica powder, titanium dioxide-coated mica powder and the like can be conveniently used. These pigments can be used either alone or in combination of two or more.

An adequate blend ratio of such pigment(s) in total is, per 100 mass parts of the combined solid resin content of the water-dispersible acrylic polymer particles (A), hydroxyl-containing resin (B) and curing agent (C), within a range of generally 0-250 mass parts, in particular, 3-150 mass parts.

The water-based paint composition of the present invention can further be suitably blended with curing catalyst, dispersing agent, antisettling agent, organic solvent, defoaming agent, thickener, UV absorber, light stabilizer, surface regulating agent and the like, where necessary.

Because the water-based paint composition of the present invention gives coating film of excellent performance such as finished appearance and chipping resistance, it suits to be used, for example, as intermediate paint and top paint for automobiles.

Application of the water-based paint composition of the present invention onto a coating object can be carried out by per se known means, for example, air spray coating, airless spray coating, rotary atomizing coating, curtain coat flow coating or the like. Where necessary, static electricity may be applied in these coating means. As the coating means, particularly rotary atomizing coating under electrostatic impression is preferred. The coating can be effected all at once or dividedly in plural times, until the desired film thickness is obtained. Preferred film thickness of the water-based paint composition of the present invention is, in terms of cured coating film, normally within a range of 3-100 μm, in particular, 5-60 μm. The coating film can be cured by heating at about 120-about 170° C., in particular, about 130-about 160° C., for 10-40 minutes. The heat-curing can be effected with per se known heating means, such as drying oven, e.g., hot air oven, electric oven, infrared ray induction furnace, and the like. Where necessary, preheating at temperatures of about 50-about 80° C. for around 3-10 minutes may be conducted preceding the heat-curing, for promoting volatilization of volatile component such as the solvent.

The coating object is subject to no particular limitation, which may be, for example, sheet steel such as cold-rolled sheet steel, zinc-plated sheet steel, zinc alloy-plated sheet steel, stainless steel sheet and tin-plated sheet steel; metal substrates such as aluminum plate and aluminum alloy plate; and various plastic materials. They may also be bodies of various vehicles such as automobiles, two-wheeled vehicles and container cars formed thereof.

The coating objects may also be metallic surfaces of metal substrates or of car bodies, which have been given a surface treatment such as phosphate treatment, chromate treatment or complex oxide treatment.

These coating objects may also be advancedly applied with undercoating (e.g., cationic electrocoating) and may optionally be applied with an intermediate coating.

Furthermore, a coating film may be formed in advance on the coating object, by applying onto the intermediate coat a coloring paint or the like as a top coat.

The water-based paint composition of the present invention can be applied, as mixed with additives or the like which are added in the occasion of use where necessary and diluted by addition of water and/or organic solvent, where necessary, to be adjusted to have an adequate viscosity. The adequate viscosity in that occasion differs depending on composition of the paint. Whereas, when the viscosity is adjusted with Ford cup viscosimeter No. 4, it is normally within a range of about 20-about 60 seconds, preferably about 25-about 50 seconds, at 20° C. The solid coating concentration of the present paint is normally within a range of about 5-about 65 mass %, preferably about 10-about 45 mass %.

Multilayer Coating Film-Forming Method

The present invention also provides a multilayer coating film-forming method (which may be hereafter referred to as "the present method"), which comprises applying onto a coating object a cationic electrocoating paint (a) and heat-curing the same, then applying an intermediate paint (b) and heat-curing the same, and thereafter applying a top paint (c) and curing the same, characterized in that the water-based paint composition of the present invention is applied as the intermediate paint (b) and/or top paint (c).

As the coating object, those earlier named can be used.

As the cationic electrocoating paint (a) to be applied onto a coating object according to the present method, those known per se which are usually used as primer in coating metallic substrate can be used. Specifically, for example, water-based paint formed by blending with basic water-soluble or water-dispersible resin which can be solubilized or dispersed in water as neutralized with organic acid or inorganic acid, e.g., epoxy, acrylic or polybutadiene resin having many amino groups in the resinous skeleton, a neutralizer, pigment (coloring pigment, extender, rust-proofing pigment and the like), hydrophilic solvent and water, and further where necessary, curing agent and additive(s), can be used. As the neutralizer for solubilizing or dispersing the basic water-soluble or water-dispersible resin in water, for example, organic acid such as acetic acid, hydroxylacetic acid, propionic acid, butyric acid, lactic acid, glycine and the like; or inorganic acid such as sulfuric acid, hydrochloric acid, phosphoric acid and the like can be used. Adequate use rate of these neutralizers is such that the neutralization equivalent to the amine value of the resin (normally within a range of about 30-about 200 mgKOH/g) should fall within a range of about 0.1-about 1.0.

The cationic electrocoating paint (a) is diluted with deionized water to the solid content within a range of normally 5-40 mass %, preferably 8-30 mass %, formed into an electrocoating bath having a pH within a range of 5.5-8.0, and can be cationic electrocoated on the coating object by any conventional method. Preferred thickness of so formed electrocoating film normally ranges about 10-about 40 μm, in particular, about 15-about 30 μm. So formed cationic electrocoating film can be cured by heating at about 140-about 210° C., preferably at about 160-about 180° C., for around 10-40 minutes.

Then an intermediate paint (b) is applied onto the electrocoating film. As the intermediate paint (b), a water-based paint composition of the present invention or intermediate paint other than the present paint can be used.

As intermediate paint other than the present paint, those per se known as such can be used. Specifically, intermediate paints containing alkyd resin and/or polyester resin as the base resin and amino resin as the curing agent can be conveniently used. The alkyd resin and/or polyester resin preferably has a hydroxyl value within a range of normally 60-140 mgKOH/g, in particular, 70-120 mgKOH/g; and an acid value within a range of normally 10-50 mgKOH/g, in particular, 15-45 mgKOH/g. As the amino resin serving as a curing agent, for example, alkyletherified melamine resin, urea resin, benzoguanamine resin and the like are suitable. Preferred blend ratio of the base resin and curing agent is, based on the combined solid mass, within a range of generally 65-85%, in particular, 70-80%, of the alkyd resin and/or polyester resin, and within a range of normally 35-15%, in particular, 30-20% of the amino resin. It is also possible to use, as the curing agent, polyisocyanate compound or blocked polyisocyanate compound in place of the amino resin. Furthermore, extender, coloring pigment and other paint additives may be blended where necessary. The intermediate paint other than the present paint may be either organic solvent-based or water-based, while water-based form is preferred from the viewpoint of reducing VOC content.

Application and heat-curing of the intermediate paint can be carried out by the methods similar to those as described as to the water-based paint composition of the present invention.

Then top paint (c) is applied onto the intermediate coating film. As the top paint (c), a water-based paint composition of the present invention or top paint other than the present paint can be used.

As top paint other than the present paint, those known per se can be used. Specifically, for example, liquid paint of acrylic resin/amino resin type, alkyd resin/amino resin type, polyester resin/amino resin type or acid resin/epoxy resin type can be used. These liquid paints may be either organic solvent-based or water-based.

These top paints can be classified into colored paint blended with coloring pigment, metallic paint blended with metallic pigment, and clear paint containing none or little of these pigments. According to the present method, these paints are suitably combined and applied by 1-coat system (1C1B), 2-coat system (2C1B, 2C2B) and the like to form the top coating film.

Specifically, for example, solid color finish by 1-coat system comprising applying a colored paint onto the heat-cured intermediate coating film to a film thickness of about 10-about 40 μm, and preheating the same film, where necessary, at a temperature of about 50-about 80° C. for around 3-10 minutes, followed by heating at about 100-about 160° C. for 10-40 minutes; solid color or metallic finish by 2-coat-1-bake system (2C1B) or 2-coat-2-bake system (2C2B) which comprises applying a colored paint or metallic paint onto the heat-cured intermediate coating film to a film thickness of about 10-about 30 μm, preheating the same film, where necessary, at a temperature of about 50-about 80° C. for 3-10 minutes, applying a clear paint onto heat-cured or uncured coating film to a film thickness of about 20-about 60 μm, and where necessary pre-heating the applied film at a temperature of about 50-about 80° C. for 3-10 minutes, followed by heating at a temperature of about 100-about 160° C. for 10-40 minutes, can be carried out.

In the multilayer coating film-forming method of the present invention, the water-based paint composition of the present invention is used as at least either of the intermediate paint and top paint.

The water-based paint composition of the present invention can be favorably used as the top paint, in particular, as colored paint or metallic paint.

EXAMPLES

Hereinafter the invention is explained more specifically, referring to working Examples and Comparative Examples, it being understood that the invention is not limited to the following Examples only. "Part" and "%" appearing hereafter are by mass, and thickness of coating film is always based on that of cured film.

Production of Water-Dispersible Acrylic Polymer Particles (A)

Production Example 1

A reactor equipped with a thermometer, thermostat, stirrer, reflux condenser and a dropping device was charged with 82 parts of deionized water and 1.0 part of ADEKARIASOAP SR-1025$^{(note\ 1)}$, mixed by stirring in gaseous nitrogen current, and the temperature was raised to 75° C. Then 3% of the total amount of an emulsion$^{(note\ 2)}$ of the specified monomers and the initiator and 10 parts of 5% aqueous ammonium persulfate solution were introduced into the reactor and maintained at 75° C. for 2 hours. Thereafter the remainder of the monomer-initiator emulsion was dropped into the reactor over 5 hours, and aged for 6 hours after completion of the dropping. Then the reaction mixture was cooled to 30° C. and adjusted to have a solid content of 40% and pH of 6.8, with 5.0% aqueous dimethylethanolamine solution and deionized water, followed by discharge under filtration with 200-mesh Nylon cloth, to provide water-dispersible acrylic polymer particles 1 (solid content 40 wt %) having an average particle size of 140 nm (measured as diluted with deionized water, at 20° C., with Sub-micron Particle Size Distribution-measuring Apparatus, COULTER N4 Model, tradename, Beckman Coulter, Inc.), an acid value of 11 mgKOH/g and hydroxyl value of 24 mgKOH/g.

(Note 1) ADEKARIASOAP SR-1025: tradename, ADEKA Corporation, an ammonium salt of α-sulfo-ω-(1-(alkoxy)methyl-2-(2-propenyloxy)ethoxy)-poly(oxy-1,2-ethan-di-yl), active component, 25%

(Note 2) monomer-initiator emulsion: a monomer-initiator emulsion obtained by mixing and stirring 55 parts of deionized water, 4 parts of LATEMUL E-118B (tradename, KAO Corporation, sodium polyoxyethylene alkyl ether sulfate, active component 26%), 10 parts of styrene, 53.5 parts of methyl methacrylate, 30 parts of n-butyl acrylate, 5 parts of 2-hydroxyethyl acrylate, 1.5 parts of acrylic acid and 0.2 part of 2,2'-azobis[2-(2-imidazolin-2-yl)propane].

Production Examples 2-8

Production Example 1 was repeated except that the composition of the minomer-initiator emulsion was changed as indicated in the following Table 1, to provide water-dispersible acrylic polymer particles 2-8. In Production Examples 6-8, however, 2,2'-azobis[2-(2-imidazolin-2-yl)propane] of above (note 2) was replaced with ammonium persulfate, as the initiator.

The solid contents, acid values and hydroxyl values of thus obtained water-dispersible, acrylic polymer particles 2-8 are shown in the following Table 1, concurrently with the solid content, acid value and hydroxyl value of the water-dispersible acrylic polymer particles 1 which were obtained in Production Example 1.

TABLE 1

| | Production Example | | | | | | | |
|---|---|---|---|---|---|---|---|---|
| | 1 | 2 | 3 | 4 | 5 | 6 | 7 | 8 |
| Water-dispersible acrylic polymer particles | 1 | 2 | 3 | 4 | 5 | 6 | 7 | 8 |
| Deionized water | 82 | | | | | | | |
| ADEKARIASOAP SR-1025 (note 1) | 1.0 | | | | | | | |
| 0.5% aqueous ammonium persulfate solution | 10 | | | | | | | |
| Monomeric emulsion — deionized water | 55 | | | | | | | |
| styrene | 10 | 10 | 10 | 10 | 10 | 10 | 10 | 10 |
| methyl methacrylate | 53.5 | 53 | 53.5 | 53 | 53 | 51.5 | 53.5 | 53.5 |
| n-butyl acrylate | 30 | 30 | 30 | 30 | 30 | 30 | 30 | 30 |
| 2-hydroxyethyl acrylate | 5 | 5 | | | | 5 | 5 | 5 |
| 2-hydroxyethyl methacrylate | | | 5 | 5 | 5 | | | |
| methacrylic acid | | 2 | | 2 | 2 | | | |
| acrylic acid | 1.5 | | 1.5 | | | 1.5 | 1.5 | 1.5 |
| 1,6-hexanediol diacrylate | | | | | | 2 | | |
| n-octyl-3-mercaptopropionate | | | | | | | | 0.3 |
| LATEMUL E-118B | 4 | 4 | 4 | 4 | 2 | 4 | 4 | 4 |
| ADEKARIASOAP ER-40 (note 3) | | | | | 8 | | | |
| 2,2'-Azobis[2-(2-imidazolin-2-yl)propane] | 0.2 | 0.2 | 0.2 | 0.2 | 0.2 | | | |
| Ammonium persulfate | | | | | | 0.5 | 0.25 | 0.5 |
| Reaction temp. (° C.) | 75 | | | | | 85 | | |
| Weight-average molecular weight (ten-thousands) | 180 | 195 | 250 | 290 | 300 | 1000< | 50 | 9 |
| Absorbance | 0.10 | 0.05 | 0.09 | 0.08 | 0.05 | 1.5 | 0.35 | 0.05 |
| Average particle size (nm) | 140 | 145 | 143 | 142 | 135 | 116 | 130 | 128 |
| Acid value (mgKOH/g) | 11 | 13 | 11 | 13 | 13 | 11 | 11 | 11 |
| Hydroxyl value (mgKOH/g) | 24 | 24 | 21.6 | 21.6 | 21.6 | 24 | 24 | 24 |
| Solid concentration (wt %) | 40 | 40 | 40 | 40 | 40 | 40 | 40 | 40 |

(Note 3) ADEKARIASOAP ER-40: tradename, ADEKA Corporation, α-hydro-ω-(1-(alkoxy)methyl-2-(2-propenyloxy)ethoxy)-poly(oxy-1,2-ethane-di-yl), active component 60%.

Production of Hydroxyl-Containing Resin (B)

Production Example 9

A 4-necked flask equipped with a heater, stirrer, thermometer, reflux condenser and rectification column was charged with 243.7 parts of 1,3-cyclohexanedicarboxylic acid, 275.9 parts of adipic acid, 247.2 parts of trimethylolpropane, 95.1 parts of neopentyl glycol and 175.7 parts of 1,4-cyclohexanedimethanol, and the temperature therein was raised from 160° C. to 230° C. over 3 hours. The temperature was kept at 230° C. for subsequent 2 hours, and the formed water of condensation was distilled off with the rectification column.

Then the rectification column was replaced with a water separator. Suitably adding toluene, the refluxing condition at 230° C. was maintained to advance the condensation reaction, while separating and distilling off the water of condensation with the water separator. At the timepoint when the resin's acid value became 2, toluene was distilled off under reduced pressure.

Then 59.0 parts of trimellitic anhydride was added to the reaction product to effect an addition reaction at 170° C. for 30 minutes. Then 100 parts of dipropylene glycol monomethyl ether was added and the temperature was dropped to 80° C. Neutralizing the product with N,N-dimethylethanolamine and further slowly adding deionized water to disperse the neutralized product in the water, hydroxyl-containing polyester resin (B-1) (pH=6.8) having a solid content of 40% was obtained. The hydroxyl-containing polyester resin (B-1) had an acid value of 36 mgKOH/g, hydroxyl value of 138 mgKOH/g and number-average molecular weight of 2,000.

Production Example 10

A reactor equipped with a thermometer, thermostat, stirrer, reflux condenser and a dropping device was charged with 145 parts of deionized water and 1.2 parts of Newcol 562SF (Note 4), mixed and stirred in gaseous nitrogen current and the temperature therein was raised to 80° C. Then 5% of the total amount of the following monomeric emulsion (1) and 5.2 parts of 3% aqueous ammonium persulfate solution were introduced into the reactor and maintained at 80° C. for 20 minutes.

Thereafter the remainder of the monomeric emulsion (1) was dropped into the reactor over 3 hours, followed by 30 minutes' aging. Then the following monomeric emulsion (2) was added drop wise over 1.5 hours, aged for 2 hours and cooled to 30° C. under gradual addition of 89 parts of 1.5% aqueous dimethylethanolamine solution into the reactor. The reaction mixture was discharged while being filtered through a 100-mesh Nylon cloth, to provide hydroxyl-containing acrylic resin (B-2) having a solid content of 25%. The hydroxyl-containing acrylic resin (B-2) had a hydroxyl value of 22 mgKOH/g, acid value of 30 mgKOH/g and average particle size of 100 nm.

(Note 4) Newcol 562SF: tradename, Nippon Nyukazai Co., Ltd., ammonium polyoxyethylenealkylbenzenesulfonate, active component 60%.

Monomeric emulsion (1): Monomeric emulsion (1) was obtained by mixing with stirring 94.3 parts of deionized water, 17 parts of methyl methacrylate, 80 parts of n-butyl acrylate, 3 parts of allyl methacrylate and 1.2 parts of Newcol 562SF.

Monomeric emulsion (2): Monomeric emulsion (2) was obtained by mixing with stirring 37.3 parts of deionized water, 15.4 parts of methyl methacrylate, 2.9 parts of n-butyl acrylate, 5.9 parts of hydroxyethyl acrylate, 5.1 parts of methacrylic acid, 0.5 part of Newcol 562SF and 1.7 parts of 3% aqueous ammonium persulfate solution.

Production Example 11

A reactor equipped with a thermometer, thermostat, stirrer, reflux condenser and dropping device was charged with 50 parts of butyl cellosolve which was heated to 120° C. Further a mixture of, as the monomers, 10 parts of styrene, 25 parts of methyl methacrylate, 20 parts of n-butyl methacrylate, 25 parts of n-butyl acrylate, 15 parts of 2-hydroxyethyl methacrylate and 5 parts of acrylic acid, and 6 parts of 2,2-azobis (2-methylbutyronitrile) as a radical polymerization initiator was added dropwise over 5 hours, followed by 2 hours' aging. Then N,N-dimethylethanolamine (of the amount that the neutralization equivalent of the carboxyl groups with amine became 1.0) was added to neutralize the reaction product. Diluting the neutralization product with butyl cellosolve, hydroxyl-containing resin (B-3) having a solid content of 65% was obtained. The hydroxyl-containing resin (B-3) had a hydroxyl value of 72.5 mgKOH/g, acid value of 39 mgKOH/g and number-average molecular weight of 5,500.

Production Example 12

A reactor equipped with a stirrer, reflux condenser, water separator and thermometer was charged with 273 parts of trimethylolpropane, 200 parts of succinic anhydride and 490 parts of CARDURA E10P (tradename, Japan Epoxy Resins Co., Ltd., neodecanoic acid monoglycidyl ester), which were reacted at 100-230° C. for 3 hours (the reaction mixture sampled then had a hydroxyl value of 350 mgKOH/g and a number-average molecular weight of 580). Then further 192 parts of trimellitic anhydride was added and condensation-reacted at 180° C., to provide hydroxyl-containing polyester resin (B-4). Thus obtained hydroxyl-containing resin (B-4) had an acid value of 49 mgKOH/g, hydroxyl value of 195 mgKOH/g and number-average molecular weight of 1500.

Production Example 13

A 4-necked flask equipped with a heater, stirrer, thermometer, reflux condense and rectification column was charged with 81.3 parts of neopentyl glycol, 211.3 parts of trimethylolpropane, 298.1 parts of hexahydrophthalic anhydride, 180.8 parts of adipic acid and 247.7 parts of 2-butyl-2-ethyl-1,3-propanediol, and heating was initiated. After raising the temperature from 160° C. to 230° C. over 5 hours, the system was maintained at 230° C. for 2 hours and the formed water of condensation was distilled off with the rectification column. Then the rectification column was replaced with a water separator, toluene was suitably added, refluxing condition was maintained at 230° C. and the condensation reaction was advanced while separating the water of condensation with the water separator. At the timepoint when the resin acid value reached 5, toluene was distilled off under reduced pressure.

Subsequently 60.2 parts of trimellitic anhydride was added to the reaction product to effect the addition reaction at 170° C. for 30 minutes, followed by addition of 100 parts of dipropylene glycol monomethyl ether. Neutralizing the product by addition of N—N-dimethylethanolamine at 80° C. and further adding deionized water slowly to disperse the neutralized product in the water, hydroxyl-containing polyester resin (B-5) (pH=6.8) having a solid content of 40% was obtained. The hydroxyl-containing resin (B-5) had an acid value of 35 mgKOH/g, hydroxyl value of 150 mgKOH/g and number-average molecular weight of 1370.

Production Example 14

A reactor equipped with a thermometer, thermostat, stirrer, reflux condenser and dropping device was charged with 50 parts of butyl cellosolve and which was heated to 120° C. Further a mixture of 10 parts of styrene, 60 parts of methyl methacrylate, 13.7 parts of n-butyl acrylate, 10 parts of 2-hydroxyethyl acrylate and 6.3 parts of acrylic acid, as monomers, and 3 parts of azoisobutyronitrile was added dropwise over 5 hours, followed by an hour's aging. Thereafter neutralizing the reaction product by addition of N,N-dimethylethanolamine (of the amount which made the neutralization equivalent of the carboxyl groups with amine 1.0), hydroxyl-containing acrylic resin (B-6) having a solid content of 65% was obtained. The hydroxyl-containing resin (B-6) had an acid value of 50 mgKOH/g, hydroxyl value of 50 mgKOH/g and number-average molecular weight of 10,000.

Production of Water-Based Paint Compositions 1 (Water-Based Intermediate Paints)

Example 1

Mixing 50 parts of the hydroxyl-containing resin (B-1) as obtained in Production Example 9, 1 part of Carbon MA100 (tradename, Mitsubishi Chemical Corporation, Carbon Black), 70 parts of JR806 (tradename, Tayca Corporation, titanium white) and 10 parts of MICRO ACE S-3 (tradename, Nippon Talc Co., Ltd., micro-size powder talc), and further dispersing the mixture with a paint shaker for 30 minutes, pigment-dispersed paste 1 was obtained.

To 131 parts of the pigment-dispersed paste 1, 62.5 parts of the water-dispersible acrylic polymer particles 1 as obtained in Production Example 1, 62.5 parts of the hydroxyl-containing resin (B-1) as obtained in Production Example 9 and 30 parts of CYMEL 212 (tradename, Mitsui Cytec Ltd., methoxy-butoxy mixed alkylated melamine resin) were added under stirring by the stated order. Further adding thereto deionized water and dimethylethanolamine to adjust the pH to 8.5 and the viscosity to 40 second as measured with Ford cup No. 4, water-based paint composition 1-1 was obtained.

Examples 2-7 and Comparative Examples 1-4

Water-based paint compositions 1-2 to 1-11 were obtained by mixing with stirring the blends as identified in the following Table 2, in the manner similar to Example 1.

VPLS 2310 in the following Tables 2 and 3 is a tradename of hexamethylene diisocyanate type methyl ethyl ketoxime-blocked isocyanate having a number-average molecular weight of 1,000, manufactured by Sumika Bayer Urethane Co., Ltd.

Using the water-based paint compositions 1-1 to 1-11 as obtained in Examples 1-7 and Comparative Examples 1-4, test panels of the respective compositions were prepared as follows.

Onto a PARBOND #3020 (tradename, Nippon Parkerizing Co., Ltd., zinc phosphate-treating agent)-treated cold-rolled steel sheet, ELECRON GT-10 (tradename, Kansai Paint Co., cationic electrocoating paint) was electrocoated to a film thickness of 20 μm, which was cured by heating at 170° C. for 30 minutes.

Onto the electrocoated film, each of the water-based paint compositions 1-1 to 1-11 was applied to a film thickness of 35 μm, cured by heating at 140° C. for 20 minutes, and onto which a water-based metallic base coat WBC 713 (tradename, Kansai Paint Co., acryl/melamine resin type water-based top coloring base coat paint) was applied to a film thickness of 15 μm. After allowing the coated panels to stand at room temperature for 3 minutes, preheating was conducted at 80° C. for 3 minutes. Then an organic solvent-based clear coat paint KINO #1200TW (tradename, Kansai Paint Co., acid/epoxy curing type acrylic resin-containing clear paint) was applied to a film thickness of 35 μm, and heated at 140° C. for 30 minutes to concurrently cure the base coat and clear coat and to provide the test panels.

The following performance tests were given to the above-obtained test panels. The performance test results are also shown in Table 2. In the table, blend ratios of each component in the paint blends are invariably by mass solid content.

TABLE 2

Paint Blends and Performance Test Result

| | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| Water-based paint composition | 1-1 | 1-2 | 1-3 | 1-4 | 1-5 | 1-6 | 1-7 | 1-8 | 1-9 | 1-10 | 1-11 |
| Water-dispersible acrylic polymer particles 1 | 25 | 10 | 25 | | | | | | | | |
| Water-dispersible acrylic polymer particles 2 | | | | 25 | | | | | | | |
| Water-dispersible acrylic polymer particles 3 | | | | | 25 | | | | | | |
| Water-dispersible acrylic polymer particles 4 | | | | | | 25 | | | | | |
| Water-dispersible acrylic polymer particles 5 | | | | | | | 25 | | | | |
| Water-dispersible acrylic polymer particles 6 | | | | | | | | 25 | | | |
| Water-dispersible acrylic polymer particles 7 | | | | | | | | | 25 | | |
| Water-dispersible acrylic polymer particles 8 | | | | | | | | | | 25 | |
| Hydroxyl-containing resin (B-1) | 45 | 60 | 45 | 45 | 45 | 45 | 45 | 45 | 45 | 45 | 70 |
| SYMEL 212 | 30 | 30 | | 30 | 30 | 30 | 30 | 30 | 30 | 30 | 30 |
| VPLS2310 | | | 30 | | | | | | | | |
| CARBON MA-100 | 1 | 1 | 1 | 1 | 1 | 1 | 1 | 1 | 1 | 1 | 1 |
| JR806 | 70 | 70 | 70 | 70 | 70 | 70 | 70 | 70 | 70 | 70 | 70 |
| MICRO ACE S-3 | 10 | 10 | 10 | 10 | 10 | 10 | 10 | 10 | 10 | 10 | 10 |
| Chipping resistance | ⊙ | ○ | ⊙ | ⊙ | ⊙ | ⊙ | ⊙ | ○ | Δ | Δ | X |
| Finished appearance (horizontal LW) | 2.5 | 2.1 | 2.2 | 2.7 | 2.9 | 3.2 | 2.3 | 6.8 | 5.7 | 4.9 | 2.9 |
| Finished appearance (horizontal SW) | 9.8 | 8.5 | 8.6 | 10.2 | 11.3 | 12.4 | 9.2 | 23.6 | 17.4 | 13.1 | 12.3 |
| Finished appearance (vertical LW) | 5.5 | 4.6 | 4.8 | 5.8 | 6.3 | 7.1 | 5.2 | 9.2 | 8.3 | 7.6 | 6.1 |
| Finished appearance (vertical SW) | 12.4 | 11.3 | 11.5 | 12.8 | 13.1 | 13.5 | 12.2 | 26.8 | 19.7 | 18.1 | 12.9 |
| Water resistance | ○ | ○ | ○ | ○ | ○ | ○ | ○ | Δ | X | X | Δ |

Chipping Resistance:

Each of the test panels was mounted on a test piece support in Suga Test Instruments Co., Ltd.'s flying stone tester JA-400 Model (tradename, a chipping test device), and 50 g of crushed granite rock of particle size No. 7 was blown at the coated surface with compressed air of 0.392 MPa (4 kgf/cm$^2$). The extent of thereby incurred damage on the coated film was visually observed and evaluated:

⊙: size of the damage was small and the coated film of the water-based intermediate paint (paint composition of the present invention) was slightly exposed;

◯: size of the damage was small and the coating film of the water-based intermediate composition and a part of the electrocoated film were slightly exposed;

Δ: size of the damage was small but the electrocoated film and substrate steel sheet were slightly exposed;

×: size of the damage was considerably large and the substrate steel sheet was broadly exposed.

Finished appearance: measured with BYK Gardner's Wave Scan (tradename) which measured Long Wave value (LW) and Short Wave value (SW). Long Wave value is an index of amplitude of surface roughness of the wavelength ranging 1.2-12 mm, and can evaluate the condition of medium wave texture of coated film surface. Short Wave value is an index of amplitude of surface roughness of the wavelength ranging 0.3-1.2 mm, and can evaluate the condition of fine texture of coated film surface. As to both of the Wave Scan values, less measured values indicate higher smoothness of the coating film surface. By way of a yardstick, generally Wave Scan values less than 15 indicate favorable coated surface smoothness. The indication, "horizontal" means that the test panel whose coating was completed was set, pre-dried and heat-cured in horizontal state at 0° angle to the horizontal plane, and "vertical" means that the test panel whose coating was completed was set, pre-dried and heat-cured in vertical condition at 90° angle to the horizontal plane.

Water resistance: The test panels were left standing in a 20° C. thermostatic chamber for 24 hours and thereafter dipped in warm water of 80° C. for 5 hours. Leaving the panels in dipped state and the temperature of the dipping water was gradually cooled from 80° C. to room temperature. The surface condition of the test panels then withdrawn from the water was visually evaluated according to the following criteria:

◯: favorable luster
Δ: inferior luster
×: inferior luster and the coated surface clouded.

Production of Water-Based Paint Compositions 2 (Water-Based Base Coat Paints)

Example 8

To 100 parts of the hydroxyl-containing resin (B-2) as obtained in Production Example 10, 30.8 parts of the hydroxyl-containing resin (B-3) as obtained in Production Example 11, 20 parts of the hydroxyl-containing resin (B-4) as obtained in Production Example 12, 25 parts of water-dispersible acrylic polymer particles 1 as obtained in Production Example 1 and 31.3 parts of CYMEL 325 (tradename, Mitsui Cytec Ltd., methoxy-butoxy mixed alkylated melamine resin) were added under stirring, by the stated order. Thereafter Alumi Paste GX180A (tradename, Asahi Kasei Corporation, aluminum flake paste) in an amount corresponding to 20 parts of aluminum pigment was added under stirring to be mixed and dispersed. Further dimethylethanolamine and deionized water wee added to adjust the pH to 8.0 and the viscosity to 40 seconds at 20° C. as measured with Ford cup No. 4, to provide water-based paint composition 2-1.

Examples 9-14 and Comparative Examples 5-8

Water-based paint compositions 2-2 to 2-11 were obtained by mixing with stirring the blends as identified in the following Table 3, in the manner similar to Example 8.

Using the water-based paint compositions 2-1 to 2-11 as obtained in Examples 8-14 and Comparative Examples 5-8, test panels of the respective compositions were prepared as follows.

Onto a PARBOND #3020 (tradename, Nippon Parkerizing Co., Ltd., zinc phosphate-treating agent)-treated cold-rolled steel sheet, ELECRON GT-10 (tradename, Kansai Paint Co., cationic electrocoating paint) was electrocoated to a film thickness of 20 μm, which was cured by heating at 170° C. for 30 minutes.

Onto the electrocoated film, water-based intermediate paint WP305 (tradename, Kansai Paint Co., acryl/melamine resin type water-based intermediate paint) was applied to provide a 35 μm-thick coating film, which was cured by heating at 140° C. for 20 minutes. Thereafter onto the intermediate coating film, each of the water-based paint compositions 2-1 to 2-11 was applied as a base coat paint, to provide a 15 μm-thick coating film, which was allowed to stand at room temperature for 3 minutes and preheated at 80° C. for 3 minutes. Then an organic solvent-based clear coat paint KINO #1200 TW (tradename, Kansai Paint Co., acid/epoxy curing type acrylic resin-containing clear paint) was applied to provide a 35 μm-thick coating film, and heated at 140° C. for 30 minutes to concurrently cure the two coating films of the base coat and clear coat, and to provide the test panels.

The following performance tests were given to the above-obtained test panels. The performance test results are also shown in Table 3. In the Table, blend ratios of each component in the paint blends are invariably by mass solid content.

TABLE 3

Paint Blends and Performance Test Result

| | Example | | | | | | | Comparative Example | | | |
| --- | --- | --- | --- | --- | --- | --- | --- | --- | --- | --- | --- |
| | 8 | 9 | 10 | 11 | 12 | 13 | 14 | 5 | 6 | 7 | 8 |
| Water-based paint composition | 2-1 | 2-2 | 2-3 | 2-4 | 2-5 | 2-6 | 2-7 | 2-8 | 2-9 | 2-10 | 2-11 |
| Water-dispersible acrylic polymer particles 1 | 10 | 20 | 10 | | | | | | | | |
| Water-dispersible acrylic polymer particles 2 | | | | 10 | | | | | | | |
| Water-dispersible acrylic polymer particles 3 | | | | | 10 | | | | | | |
| Water-dispersible acrylic polymer particles 4 | | | | | | 10 | | | | | |
| Water-dispersible acrylic polymer particles 5 | | | | | | | 10 | | | | |
| Water-dispersible acrylic polymer particles 6 | | | | | | | | 10 | | | |
| Water-dispersible acrylic polymer particles 7 | | | | | | | | | 10 | | |
| Water-dispersible acrylic polymer particles 8 | | | | | | | | | | 10 | |
| Hydroxyl-containing resin (B-2) | 25 | 25 | 25 | 25 | 25 | 25 | 25 | 25 | 25 | 25 | 35 |
| Hydroxyl-containing resin (B-3) | 20 | 10 | 20 | 20 | 20 | 20 | 20 | 20 | 20 | 20 | 20 |
| Hydroxyl-containing resin (B-4) | 20 | 20 | 20 | 20 | 20 | 20 | 20 | 20 | 20 | 20 | 20 |
| CYMEL325 | 25 | 25 | | 25 | 25 | 25 | 25 | 25 | 25 | 25 | 25 |
| VPLS2310 | | | 25 | | | | | | | | |
| GX180A | 20 | 20 | 20 | 20 | 20 | 20 | 20 | 20 | 20 | 20 | 20 |

TABLE 3-continued

Paint Blends and Performance Test Result

|  | Example | | | | | | | Comparative Example | | | |
| --- | --- | --- | --- | --- | --- | --- | --- | --- | --- | --- | --- |
|  | 8 | 9 | 10 | 11 | 12 | 13 | 14 | 5 | 6 | 7 | 8 |
| Chipping resistance | ⊙ | ⊙ | ⊙ | ⊙ | ⊙ | ⊙ | ⊙ | ○ | Δ | Δ | X |
| Finished appearance (horizontal SW) | 10.3 | 13.1 | 9.1 | 10.9 | 12.8 | 13.1 | 9.7 | 25.3 | 18.5 | 15.4 | 13.6 |
| Finished appearance (vertical SW) | 13.4 | 14.8 | 12.9 | 13.9 | 14.3 | 14.6 | 13.2 | 28.2 | 20.5 | 19.5 | 14.2 |
| IV value | 278 | 288 | 248 | 263 | 267 | 272 | 285 | 195 | 212 | 224 | 235 |
| Water resistance | ○ | ○ | ○ | ○ | ○ | ○ | ○ | Δ | X | Δ | Δ |

The test and evaluation methods were as follows.

Chipping resistance: The test was given by the same method as that described under "Production of water-based paint compositions 1".

Finished appearance: Similarly to the method as described under "Production of water-based paint compositions 1", SW values were measured.

IV value: IV values were measured with a laser metallic effect measuring device (ALCOPE LMR-200, tradename, Kansai Paint Co.). IV is an index of whiteness of metallic coating film. The higher the degree of uniform orientation of metallic pigment in parallel with the coated surface, the higher the degree of whiteness and the better the metallic effect. Higher IV values indicate higher whiteness.

Water resistance: The test panels were left standing in a 20° C. thermostatic chamber for 24 hours, and thereafter dipped in 80° C. warm water for 5 hours. Adherability of the coated film on each of the test panels which were withdrawn from the warm water was evaluated by the following criteria.

Each of the coated surface of the test panels was cross-cut with a cutter knife to the depth reaching the substrate, to form one-hundred 2 mm×2 mm squares. Adhesive cellophane tape was stuck on the area in which the one-hundred squares were formed and then rapidly peeled off. The remaining number of the square coating films was evaluated according to the following criteria:

| ○: remaining number of squares | 100/100; |
| --- | --- |
| Δ: remaining number of squares | 95-99/100; |
| x: remaining number of squares | less than 95/100. |

Production of Water-Based Paint Compositions 3 (Water-Based Top Solid Coat Paint)

Example 15

Pigment-dispersed paste 2 was obtained by mixing 15.4 parts of hydroxyl-containing resin (B-6) as obtained in Production Example 14, 10 parts of butyl cellosolve and 80 parts of JR 806 (tradename, Tayca Corporation, titanium white) and dispersing the mixture with a paint shaker for 30 minutes.

To 105.4 parts of the pigment-dispersed paste 2, 62.5 parts of water-dispersible acrylic polymer particles 1 as obtained in Production Example 1, 87.5 parts of hydroxyl-containing resin (B-5) as obtained in Production Example 13 and 30 parts of CYMEL 212 (tradename, Mitsui Cytec Ltd., methoxy/butoxy mixed alkylated melamine resin) were added under stirring, by the order stated. Further deionized water and dimethylethanolamine were added to adjust the pH to 8.5 and the viscosity to 40 seconds at 20° C., as measured with Ford cup No. 4, to provide water-based paint composition 3-1.

Examples 16-20 and Comparative Examples 9-12

Water-based paint compositions 3-2 to 3-10 were obtained by mixing with stirring the blends as identified in the following Table 4, in the manner similar to Example 15.

Using the water-based paint compositions 3-1 to 3-10 as obtained in Examples 15-20 and Comparative Examples 9-12, test panels of the respective compositions were prepared as follows.

Onto a PARBOND #3020 (tradename, Nippon Parkerizing Co., Ltd., zinc phosphate-treating agent)-treated cold-rolled steel sheet, ELECRON GT-10 (tradename, Kansai Paint Co., cationic electrocoating paint) was electrocoated to a film thickness of 20 μm, which was cured by heating at 170° C. for 30 minutes.

Onto the electrocoated film, a water-based intermediate paint WP305 (tradename, Kansai Paint Co., acryl/melamine resin type water-based intermediate paint) was applied to a film thickness of 35 μm, cured by heating at 140° C. for 20 minutes, and then onto the intermediate coating film each of the water-based paint compositions 3-1 to 3-10 was applied to a film thickness of 40 μm as the top solid coat paint, which was cured by heating at 140° C. for 30 minutes.

The following performance tests were given to the above-obtained test panels. The performance test results are also shown in Table 4. In the Table, blend ratios of each component in the paint blends are invariably by mass solid content.

TABLE 4

Paint Blends and Performance Test Result

|  | Example | | | | | | Comparative Example | | | |
| --- | --- | --- | --- | --- | --- | --- | --- | --- | --- | --- |
|  | 15 | 16 | 17 | 18 | 19 | 20 | 9 | 10 | 11 | 12 |
| Water-based paint composition | 3-1 | 3-2 | 3-3 | 3-4 | 3-5 | 3-6 | 3-7 | 3-8 | 3-9 | 3-10 |
| Water-dispersible acrylic polymer particles 1 | 25 | 10 |  |  |  |  |  |  |  |  |
| Water-dispersible acrylic polymer particles 2 |  |  | 25 |  |  |  |  |  |  |  |
| Water-dispersible acrylic polymer particles 3 |  |  |  | 25 |  |  |  |  |  |  |
| Water-dispersible acrylic polymer particles 4 |  |  |  |  | 25 |  |  |  |  |  |
| Water-dispersible acrylic polymer particles 5 |  |  |  |  |  | 25 |  |  |  |  |
| Water-dispersible acrylic polymer particles 6 |  |  |  |  |  |  | 25 |  |  |  |
| Water-dispersible acrylic polymer particles 7 |  |  |  |  |  |  |  | 25 |  |  |
| Water-dispersible acrylic polymer particles 8 |  |  |  |  |  |  |  |  | 25 |  |

TABLE 4-continued

Paint Blends and Performance Test Result

|  | Example | | | | | | Comparative Example | | | |
| --- | --- | --- | --- | --- | --- | --- | --- | --- | --- | --- |
|  | 15 | 16 | 17 | 18 | 19 | 20 | 9 | 10 | 11 | 12 |
| Hydroxyl-containing resin (B-5) | 35 | 50 | 35 | 35 | 35 | 35 | 35 | 35 | 35 | 60 |
| Hydroxyl-containing resin (B-6) | 10 | 10 | 10 | 10 | 10 | 10 | 10 | 10 | 10 | 10 |
| CYMEL212 | 30 | 30 | 30 | 30 | 30 | 30 | 30 | 30 | 30 | 30 |
| JR806 | 80 | 80 | 80 | 80 | 80 | 80 | 80 | 80 | 80 | 80 |
| Gloss | 91 | 94 | 89 | 87 | 86 | 93 | 64 | 72 | 78 | 83 |
| Finished appearance (horizontal SW) | 8.2 | 6.9 | 9.1 | 10.4 | 11.5 | 7.8 | 22.1 | 16.5 | 12.3 | 11.9 |
| Finished appearance (vertical SW) | 11.3 | 10.1 | 11.4 | 12.6 | 12.8 | 11.1 | 24.5 | 18.1 | 17.6 | 12.6 |
| Water resistance (appearance) | ○ | ○ | ○ | ○ | ○ | ○ | Δ | X | X | X |
| Water resistance (adhesion) | ○ | ○ | ○ | ○ | ○ | ○ | ○ | Δ | X | X |

Gloss: Gloss was evaluated by measuring 20° specular reflectivity (20° gloss value) of the test panels.

Finished appearance: Similarly to the method as described under "Production of water-based paint compositions 1", SW values were measured.

Water resistance (appearance): The surface condition of the test panels was evaluated by the method similar to that described under "Production of water-based paint compositions 1".

Water resistance (adhesion): Adherability was evaluated by the method similar to that described under "Production of water-based paint compositions 2".

The invention claimed is:

1. A water-based paint composition comprising: water-dispersible acrylic polymer particles (A), hydroxyl-containing resin (B) and curing agent (C), the water-dispersible acrylic polymer particles (A) having a weight-average molecular weight of at least 1,100,000 and an absorbance in a liquid dispersion at a mass concentration of 1.35% in 1,4-dioxane solvent of not higher than 0.2 at a wavelength of 330 nm as measured with a spectrophotometer,
wherein the water-dispersable acrylic polymer particles (A) are obtained by emulsion polymerization of polymerizable unsaturated monomers with an azo compound as a radical polymerization initiator, and
wherein the hydroxyl-containing resin (B) is selected from the group consisting of (i) a hydroxyl-containing acrylic resin having a weight-average molecular weight within a range of 1,000-200,000 and (ii) a hydroxyl-containing polyester resin having a weight-average molecular weight within a range of 1,000-200,000.

2. The water-based paint composition according to claim 1, wherein the water-dispersible acrylic polymer particles (A) have a weight-average molecular weight within a range of 1,100,000-10,000,000.

3. The water-based paint composition according to claim 1, wherein the water-dispersible acrylic polymer particles (A) are obtained by copolymerizing a polymerizable unsaturated monomeric mixture containing 0.1-25 mass %, based on the total amount of the polymerizable unsaturated monomers, of methacrylic acid.

4. The water-based paint composition according to claim 1, wherein the water-dispersible acrylic polymer particles (A) are obtained by copolymerizing a polymerizable unsaturated monomeric mixture containing 0.1-40 mass %, based on the total amount of the polymerizable unsaturated monomers, of hydroxyl-containing methacrylate monomer(s).

5. The water-based paint composition according to claim 1, wherein the water-dispersible acrylic polymer particles (A) are obtained by copolymerizing a polymerizable unsaturated monomeric mixture containing a combined 20-80 mass % of acrylate monomer(s) and styrene, based on the total amount of the polymerizable unsaturated monomers.

6. The water-based paint composition according to claim 1, wherein the water-dispersible acrylic polymer particles (A) are obtained by copolymerization of polymerizable unsaturated monomers in the presence of a reactive emulsifier having polyoxyethylene group(s) represented by —(CH$_2$CH$_2$O)$_n$—, wherein n is an integer of 5 to 60, and polymerizable unsaturated group(s) per molecule.

7. The water-based paint composition according to claim 1, wherein the water-dispersible acrylic polymer particles (A) have a hydroxyl value within a range of 0-150 mgKOH/g and an acid value within a range of 0.1-100 mgKOH/g.

8. The water-based paint composition according to claim 1, wherein the water-dispersible acrylic polymer particles (A) have an average particle size within a range of 10-500 nm.

9. The water-based paint composition according to claim 1, wherein the water-dispersible acrylic polymer particles (A) have an absorbance not higher than 0.15.

10. The water-based paint composition according to claim 1, wherein the curing agent (C) is a melamine resin or a blocked polyisocyanate compound.

11. The water-based paint composition according to claim 1, which contains 1-80 mass % of the water-dispersible acrylic polymer particles (A), 1-90 mass % of the hydroxyl-containing resin (B) and 5-60 mass % of the curing agent (C), based on the total solid resin content of the water-dispersible acrylic polymer particles (A), hydroxyl-containing resin (B) and curing agent (C).

12. A multilayer coating film-forming method comprising applying a cationic electrocoating paint (a) on a coating object and heat-curing the same, then applying an intermediate paint (b) on paint (a) and heat-curing the same, and then applying on paint (b) a top paint (c) and curing the same, wherein the water-based paint composition of claim 1 is the intermediate paint (b) and/or the top paint (c).

13. An article coated with the water-based paint composition of claim 1.

14. A multilayer coating film-forming method comprising applying a cationic electrocoating paint (a) on a coating object and heat-curing the same, then applying an intermediate paint (b) on paint (a) and heat-curing the same, and applying on paint (b) a top paint (c) and curing the same, wherein the water-based paint composition of claim 2 is the intermediate paint (b) and/or the top paint (c).

15. A multilayer coating film-forming method comprising applying a cationic electrocoating paint (a) on a coating object and heat-curing the same, then applying an intermediate paint (b) on paint (a) and heat-curing the same, and applying on paint (b) a top paint (c) and curing the same, wherein the water-based paint composition of claim 3 the intermediate paint (b) and/or the top paint (c).

16. A multilayer coating film-forming method comprising applying a cationic electrocoating paint (a) on a coating object and heat-curing the same, then applying an intermediate paint (b) on paint (a) and heat-curing the same, and applying on paint (b) a top paint (c) and curing the same, wherein the water-based paint composition of claim 4 is the intermediate paint (b) and/or the top paint (c).

17. A multilayer coating film-forming method comprising applying a cationic electrocoating paint (a) on a coating object and heat-curing the same, then applying an intermediate paint (b) on paint (a) and heat-curing the same, and applying on paint (b) a top paint (c) and curing the same, wherein the water-based paint composition of claim 5 is the intermediate paint (b) and/or the top paint (c).

18. A multilayer coating film-forming method comprising applying a cationic electrocoating paint (a) on a coating object and heat-curing the same, then applying an intermediate paint (b) on paint (a) and heat-curing the same, and applying on paint (b) a top paint (c) and curing the same, wherein the water-based paint composition of claim 6 is the intermediate paint (b) and/or the top paint (c).

19. A multilayer coating film-forming method comprising applying a cationic electrocoating paint (a) on a coating object and heat-curing the same, then applying an intermediate paint (b) on paint (a) and heat-curing the same, and applying on paint (b) a top paint (c) and curing the same, wherein the water-based paint composition of claim 7 is the intermediate paint (b) and/or the top paint (c).

20. A multilayer coating film-forming method comprising applying a cationic electrocoating paint (a) on paint (a) on a coating object and heat-curing the same, then applying an intermediate paint (b) and heat-curing the same, and applying on paint (b) a top paint (c) and curing the same, wherein the water-based paint composition of claim 8 is the intermediate paint (b) and/or the top paint (c).

21. A multilayer coating film-forming method comprising applying a cationic electrocoating paint (a) on a coating object and heat-curing the same, then applying an intermediate paint (b) on paint (a) and heat-curing the same, and applying on paint (b) a top paint (c) and curing the same, wherein the water-based paint composition of claim 9 is the intermediate paint (b) and/or the top paint (c).

22. A multilayer coating film-forming method comprising applying a cationic electrocoating paint (a) on a coating object and heat-curing the same, then applying an intermediate paint (b) on paint (a) and heat-curing the same, and applying on paint (b) a top paint (c) and curing the same, wherein the water-based paint composition of claim 10 is the intermediate paint (b) and/or the top paint (c).

23. A multilayer coating film-forming method comprising applying a cationic electrocoating paint (a) on a coating object and heat-curing the same, then applying an intermediate paint (b) on paint (a) and heat-curing the same, and applying on paint (b) a top paint (c) and curing the same, wherein the water-based paint composition of claim 11 is the intermediate paint (b) and/or the top paint (c).

24. An article coated with the water-based paint composition of claim 2.

25. An article coated with the water-based paint composition of claim 3.

26. An article coated with the water-based paint composition of claim 4.

27. An article coated with the water-based paint composition of claim 5.

28. An article coated with the water-based paint composition of claim 6.

29. An article coated with the water-based paint composition of claim 7.

30. An article coated with the water-based paint composition of claim 8.

31. An article coated with the water-based paint composition of claim 9.

32. An article coated with the water-based paint composition of claim 10.

33. An article coated with the water-based paint composition of claim 11.

* * * * *